United States Patent [19]

Mizuno et al.

[11] 4,342,333
[45] Aug. 3, 1982

[54] EXHAUST GAS CHANGE-OVER APPARATUS

[75] Inventors: Tadatoshi Mizuno, Tokyo; Sumihiro Hosotani, Yokohama; Kaoru Nishihara, Kawasaki, all of Japan

[73] Assignee: Kabushiki Kaisha Komatsu Seisakusho, Tokyo, Japan

[21] Appl. No.: 180,384

[22] Filed: Aug. 21, 1980

[30] Foreign Application Priority Data

Aug. 27, 1979 [JP] Japan .......................... 54-116748[U]
Sep. 18, 1979 [JP] Japan .......................... 54-128116[U]

[51] Int. Cl.³ .................... F16K 11/02; F16K 51/00; B60P 1/00
[52] U.S. Cl. .................... 137/625.44; 137/597; 137/875; 251/149.2; 251/149.6; 298/1 H
[58] Field of Search .................. 251/149.2, 149.6, 80; 137/625.44, 875, 597; 298/1 H

[56] References Cited
U.S. PATENT DOCUMENTS

| | | | |
|---|---|---|---|
| 1,546,995 | 7/1925 | Petry | 137/875 |
| 2,165,640 | 7/1939 | Marx | 251/80 |
| 4,143,677 | 3/1979 | Schell | 137/625.44 |

*Primary Examiner*—Alan Cohan
*Assistant Examiner*—John Rivel, Jr.
*Attorney, Agent, or Firm*—Balogh, Osann, Kramer, Dvorak, Genova, & Traub

[57] ABSTRACT

A change-over apparatus of exhaust gas for use with a vessel of a dump truck or the like comprising a box-like housing having an inlet for the exhaust gas and first and second outlets, a first pipe mounted in the first outlet and open to the atmosphere, a second pipe mounted in the second outlet, a third pipe telescopically mounted on the second pipe and movable between a raised position where the vessel is in its dump position and a lowered position where the vessel is in its carry position and in which the second outlet is brought to a communication with a plurality of hollow ribs integrally formed with the vessel, and a shutter plate for selectively closing the first and second outlets in response to the movement of the third pipe.

2 Claims, 5 Drawing Figures

EXHAUST GAS CHANGE-OVER APPARATUS

BACKGROUND OF THE INVENTION

This invention relates to an exhaust gas change-over apparatus for use in dump trucks or the like.

The dump trucks each has an exhaust gas change-over device mounted thereon which is adapted to introduce and discharge the engine's exhaust gas into a plurality of hollow ribs of a vessel when the vessel is at its normal carry position (that is; the vessel is placed on and supported by the vehicle body) and to discharge the exhaust gas toward the side of the vehicle when the vessel is at its dump position (that is; the vessel is inclined at its maximum angle relative to the vehicle body so as to unload the cargo therein).

As for the exhaust gas change-over device of the kind specified, there has heretofore been known and employed a device comprising a box having one side wall formed with an exhaust gas inlet which is connected to an engine's exhaust gas outlet (exhaust pipe), an upper wall to which is fixedly secured a second outlet pipe adapted to introduce the exhaust gas into the hollow ribs of the vessel and another side wall to which is fixedly secured a first outlet pipe adapted to introduce and discharge the exhaust gas to the side of the vehicle, and a shutter pivotally mounted in the box so as to enable either one of said first and second outlet pipes to be selectively blocked or shut off.

This construction, however, is disadvantageous in that because the hub portion of the shutter is pivotally mounted on and carried by support shaft through its bearing, it is unable for the shutter to contact tightly with the end faces of the first and second outlet pipes because of the presence of a deviation in dimensions thereof when manufactured, and also because of the generation of idle plays of the bearing and hub portion produced by the wear down thereof resulting from their use for an extended period of time, thereby forming clearance therebetween through which the exhaust gas is allowed to leak.

As for the prior art to overcome such difficulties, there has been proposed a device in which a lever is connected to a support shaft and a shutter is pivotally mounted on the lever so that the shutter can be brought into close contact with the end face of either one of the first and second outlet pipes irrespective of the presence of idle plays and deviation in dimensions when manufactured.

However, this construction is also disadvantageous in that because of the need for forming a notch in the first outlet pipe through which the lever is allowed to pass, the exhaust gas tends to leak through the clearance between the notch and the lever when the vessel is held at its normal carry position (that is; when the shutter blocks or shuts off the first outlet pipe).

Further, there are two types of dump trucks; in one type, the engine exhaust pipe is connected to the side wall of the box of the exhaust gas change-over device, and in another type, the exhaust gas pipe is connected to the bottom wall of the box. Because of differences in the shapes of the shutter and the first and second exit pipes between the two types, it has heretofore been necessary to provide two kinds of exhaust gas change-over devices. cl SUMMARY OF THE INVENTION It is therefore an object of the present invention to provide a change-over apparatus of exhaust gas which is capable for effectively preventing gas leakage and assures a reliable change-over of exhaust gas.

Another object of the present invention is to provide a change-over apparatus of exhaust gas which has two gas inlets formed in a side and bottom walls of a housing and in which exhaust gas from an engine can be selectively introduced through either one of the gas inlets.

In accordance with an aspect of the present invention, there is provided a change-over apparatus of exhaust gas for use with a vessel of a dump truck having an exhaust pipe connected to an engine of the dump truck, said vessel having a plurality of hollow ribs integrally formed therewith, the change-over apparatus comprising: a box-like housing having a first inlet for exhaust gas formed in a first wall thereof, a first outlet for the exhaust gas formed in a second wall thereof and a second outlet for the exhaust gas formed in a third wall thereof, the second and third walls being arranged at right angles with each other; a first pipe mounted in the first outlet and open to the atmosphere; a second pipe mounted in the second outlet; a third pipe telescopically mounted on the second pipe, said third pipe having a flange fixedly secured thereto and being connectible with the hollow ribs of the vessel when said vessel is in its carry position; shutter means for selectively closing said first and second pipes, the shutter means being pivotally mounted to a fourth and a fifth walls of the housing, said fourth and fifth walls being opposed against each other; a pair of means each operatively associated with the shutter means for causing the shutter means to selectively close the first and second pipes; and first spring means disposed between the flange of the third pipe and the third wall for biasing said third pipe toward its raised position thereby urging the shutter means to close the second pipe; whereby said third pipe is movable between the raised position and a lowered position where said vessel is contacted with top end of the third pipe and said shutter means is urged to close the first pipe.

The above and other objects, features and advantages of the present invention will be readily apparent from the following description taken in conjunction with the accompanying drawings.

DESCRIPTION OF THE PREFERRED EMBODIMENTS

Figure 1:
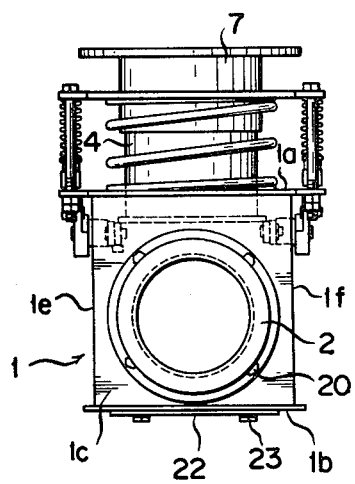
FIG. 1 is a front elevational view of a change-over apparatus of exhaust gas according to the present invention.

The present invention will now be described by way of example only with reference to the accompanying drawings.

A box 1 has an upper wall 1a, a bottom wall 1b, a front wall 1c, a rear wall 1d, a left side transverse wall 1e and a right side transverse wall 1f. Fixedly secured to the front wall 1c is an exhaust gas inlet adaptor 2 connected to the engine's exhaust gas outlet. Fixedly secured to the rear wall 1d is a first outlet pipe 3 adapted to guide and discharge the exhaust gas to one side of the vehicle, and also rigidly secured to the upper wall 1a is a second outlet pipe 4 adapted to guide and discharge the exhaust gas into a plurality of hollow ribs of the vessel.

The above-mentioned second outlet pipe 4 is fixedly secured to a hole 5 formed in the upper wall 1a and has an outer peripheral surface 4a to which a brimmed pipe 7 with a flange 6 secured thereto is telescopically fitted. A spring 8 is disposed between the flange 6 and the upper wall 1a so that the brimmed pipe 7 is upwardly biased and the flange 6 has slidably mounted at its both ends a pair of longitudinally extending rods 9, 9 which are vertically freely movable relative to the flange 6 and downwardly biased by springs 10, 10, respectively, said rods 9, 9 each having a link 11 connected thereto by means of a pin 12. The links 11 are fixedly secured, respectively, to a pair of support shafts 13, 13 at outside of the box 1, which are rotatably carried by the left and right side walls 1e, 1f of the box 1 so that the links can be turned about the support shafts 13, 13 in the vertical direction.

Further, fixedly secured to the pair of support shafts 13, 13 at inside of the box 1 are a pair of left and right side levers 14, 14.

The above-mentioned pair of left and right side levers 14, 14 are located on diametrically opposite sides of the first outlet pipe 3 and rotatably connected by means of pins 16, 16 to the hub portions of a shutter plate 15 formed at both ends thereof.

Figure 2:
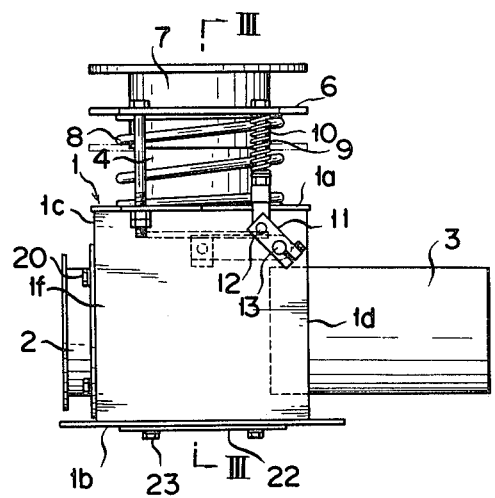
FIG. 2 is a side elevational view thereof.
Figure 3:
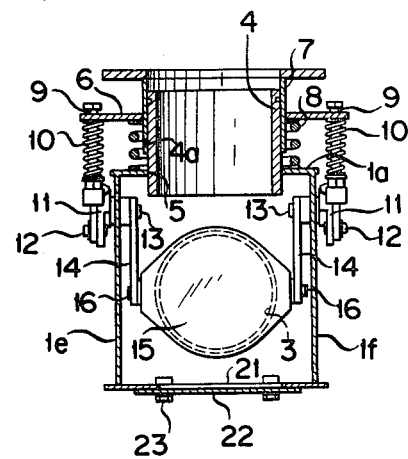
FIG. 3 is a cross-sectional view taken along the line III—III of FIG. 2.
Figure 4:
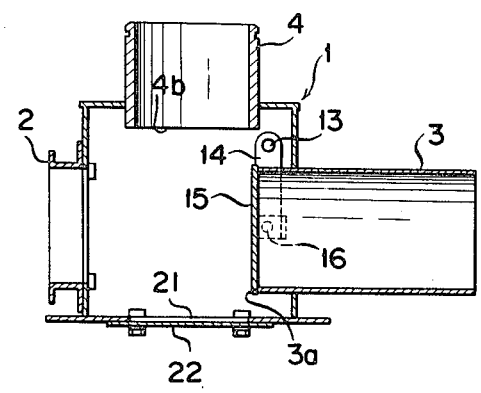
FIG. 4 is a schematic cross-sectional view of the apparatus in which a first outlet pipe is closed by a shutter plate.

Thus, when the vessel is at its normal position or carry position, the brimmed pipe 7 is depressed at its upper end by the vessel and lowered to the position shown by a phantom line in FIG. 2 thereby compressing the springs 10, 10. The resultant reaction force will cause the links 11, 11 to turn counterclockwise in FIG. 2 so that the shutter plate 15 is turned through the support shafts 13, 13 and the levers 14, 14 and brought into close contact with an end face 3a of the first outlet pipe 3 as shown in FIG. 4.

Since at that time the pair of levers 14, 14 carrying the shutter plate 15 are located on diametrically opposite sides of the first outlet pipe 3, there is no interference between the levers 14, 14 and the first outlet pipe 3, and also there is no need for forming notches in the first outlet pipe 3 in which the levers 14, 14 are allowed to pass. Therefore, the first outlet pipe 3 can be securely closed by the shutter plate 15 without any leakage of the exhaust gas from the engine.

Further, the shutter plate 15 is forcibly urged by the springs 10, 10 on the end face of the first outlet pipe 3 and is subject to self-aligning action by the pins 16, 16 connecting the levers 14, 14 and the shutter plate 15 so as to eliminate vertical clearance which is otherwise formed between the shutter plate 15 and the end face of the first outlet pipe 3. Further, because of the pair of levers 14, 14 having independent both ends, the spring forces at both ends are equalized, and so the shutter plate 15 can be moved in such a manner as to automatically eliminate the formation of clearance in the transverse direction. Consequently, the shutter plate 15 can be brought into close, uniform contact with the end face 3a of the first outlet pipe 3 thereby ensuring the prevention of leakage of the exhaust gas.

Figure 5:
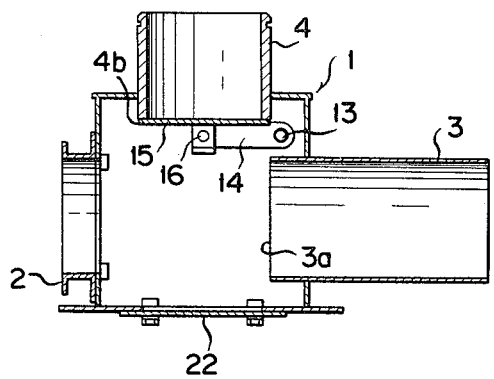
FIG. 5 is similar to FIG. 4 but showing a second outlet pipe being closed by the shutter plate.

When the vessel occupies its dump position, the brimmed pipe 7 is moved upwards automatically by the resilient force of the spring 8, followed by the upward movements of the pair of longitudinal rods 9, 9. As a result, the links 11, 11 are turned clockwise in FIG. 2 so that the shutter plate 15 is turned by the force of the spring 8 and brought into close contact with an end face 4a of the second outlet pipe 4 as shown in FIG. 5.

In the same manner as in the aforementioned case, by dint of the self-aligning action of the pins 16, 16 connected to the hub portions of the shutter plate 15 formed at both ends thereof and the equalization of the spring's resilient forces obtained by the independent pair of levers 14, 14, the shutter plate 15 can be brought into close contact with the end face 4a of the second outlet pipe 4 without causing any clearance therebetween thereby ensuring the prevention of leakage of the exhaust gas.

Though in the illustrated embodiment the exhaust gas inlet adaptor 2 is fitted to the front wall 1c of the box by means of bolts 20, the lower wall 1b of the box has also an opening 21 which is shielded by a shield plate 22. Thus, by unscrewing bolts 23 fitting the shield plate 22 to the lower wall 1b so as to remove the shield plate 22 and replacing the exhaust gas inlet adaptor 2 and the shield plate 22 and then retightening their bolts, the exhaust gas emitted by the engine can also be introduced from the lower wall 1b of the box 1.

It is to be understood that the foregoing description is merely illustrative of preferred embodiment of the present invention, and that the scope of the invention is not to be limited thereto, but is to be determined by the scope of the appended claims.

What we claim is:

1. A change-over apparatus of exhaust gas for use with a vessel of a dump truck having an exhaust pipe connected to an engine of the dump truck, said vessel having a plurality of hollow ribs integrally formed therewith, said change-over apparatus comprising:

a box-like housing having a first inlet for exhaust gas formed in a first wall thereof, a first outlet for the exhaust gas formed in a second wall thereof and a second outlet for the exhaust gas formed in a third wall thereof, said second and third walls being arranged at right angles with each other;

a first pipe mounted in said first outlet and open to the atmosphere;

a second pipe mounted in said second outlet;

a third pipe telescopically mounted on said second pipe, said third pipe having a flange fixedly secured thereto and being connectible with the hollow ribs of said vessel when said vessel is in its carry position;

shutter means for selectively closing said first and second pipes, said shutter means being pivotally mounted to a fourth and a fifth walls of said housing, said fourth and fifth walls being opposed against each other;

a pair of means each operatively associated with said shutter means for causing said shutter means to selectively close said first and second pipes; and first spring means disposed between the flange of said third pipe and said third wall for biasing said third pipe toward its raised position thereby urging said shutter means to close said second pipe; whereby said third pipe is movable between said raised position and a lowered position where said vessel is contacted with top end of said third pipe and said shutter means is urged to close said first pipe;

each of said pair of means comprising a rod having one end loosely connected with said flange and movable therein, a link pivotally connected with the other end of said rod, a support shaft fixedly connected with said link and inserted for rotation in said fourth or fifth wall of said housing thereby allowing said link to pivot at said support shaft, a lever having one end fixedly connected with said support shaft and the other end pivotally connected with said shutter means, and second spring means mounted on said rod, compressed between said flange and an abutment on said rod for urging said shutter means to close said first pipe when said third pipe contacts with said vessel and is lowered thereby, and to close said second pipe when said third pipe moves toward its raised position, so as to bring selectively said shutter means into close contact with either one of said first and second pipes, without causing any clearance therebetween, and thereby ensuring the prevention of leakage of the exhaust gas.

2. A change-over apparatus as recited in claim 1 wherein said box-like housing has a second inlet for the exhaust gas formed in a sixth wall thereof and a closing plate is detachably mounted to close said second inlet whereby exhaust gas is selectively introduced through said first and second inlets.

* * * * *